(12) United States Patent
Kortmeyer et al.

(10) Patent No.: US 12,077,691 B2
(45) Date of Patent: Sep. 3, 2024

(54) MEMBRANES WITH WATER-ACTIVATED BINDING ELEMENTS

(71) Applicant: JOHNS MANVILLE, Denver, CO (US)

(72) Inventors: Jordan Kortmeyer, Parker, CO (US); Brenton Yancey, Littleton, CO (US); Christopher James Griffin, Aurora, CO (US); Kimberly R Tokarski, Kenosha, WI (US)

(73) Assignee: Johns Manville, Denver, CO (US)

( * ) Notice: Subject to any disclaimer, the term of this patent is extended or adjusted under 35 U.S.C. 154(b) by 46 days.

(21) Appl. No.: 18/075,761

(22) Filed: Dec. 6, 2022

(65) Prior Publication Data

US 2024/0182753 A1 Jun. 6, 2024

(51) Int. Cl.
*C09J 7/32* (2018.01)
*C09J 7/22* (2018.01)
*C09J 7/40* (2018.01)
*E04D 5/10* (2006.01)
*E04D 5/14* (2006.01)

(52) U.S. Cl.
CPC . *C09J 7/32* (2018.01); *C09J 7/22* (2018.01); *C09J 7/405* (2018.01); *E04D 5/10* (2013.01); *E04D 5/148* (2013.01); *C09J 2301/306* (2020.08)

(58) Field of Classification Search
CPC ....... C09J 7/32; C09J 7/22; C09J 7/405; C09J 2301/306; E04D 5/10; E04D 5/148
See application file for complete search history.

(56) References Cited

FOREIGN PATENT DOCUMENTS

GB 2030059 A * 4/1980 ......... C04B 40/0616

* cited by examiner

*Primary Examiner* — Patricia L. Nordmeyer
(74) *Attorney, Agent, or Firm* — Robert D. Touslee (57) ABSTRACT

A roofing membrane may comprise a water-impermeable insulation layer, and a binding layer coupled to the insulation layer. In a dry state, the binding layer may be non-tacky. In an activated state, the binding layer may be tacky.

18 Claims, 6 Drawing Sheets

MEMBRANES WITH WATER-ACTIVATED BINDING ELEMENTS

BACKGROUND

Roofing membranes may be used to insulate and prevent water leakage for roofs. Roofing membranes may be of two general types: solvent-based membranes and water-based membranes. Solvent-based membranes may provide a long-lasting membrane once installed on a roof. However, industry trends are to move to water-based membranes.

Accordingly, it would be beneficial for an improved water-based roofing membrane and methods of use thereof.

SUMMARY

Embodiments of the present invention are directed to

One aspect of the disclosure provides for a roofing membrane, comprising a water-impermeable insulation layer, and a binding layer coupled to the insulation layer, wherein in a dry state, the binding layer is non-tacky, and in an activated state, the binding layer is tacky. The insulation layer may include a polymeric membrane. The binding layer in the dry state may include a water content between 0.2 wt. % of water to 5 wt. % of water. The binding layer in the dry state may be non-tacky such that the binding layer includes a coupling force of less than 0.4 pounds-force. The binding layer in the activated state may be tacky such that the binding layer includes a coupling force between 3-10 pounds-force. The binding layer in the activated state may include a water content between 55 wt. % to 90 wt. % of water. The binding layer may include an adhesive. The roofing membrane may further comprise a release layer coupled to the binding layer such that the binding layer is positioned between the insulation layer and the binding layer. The binding layer in the activated state may include an activated portion that is tacky, and the release layer may not coupled to the activated portion. The release layer may define a perforation line extending along at least a portion of the release layer.

Another aspect of the disclosure provides for a roofing membrane, comprising a water-impermeable insulation layer, a binding layer coupled to the insulation layer, wherein the binding layer is dry and non-tacky, and the binding layer is configured to be tacky upon an application of water, and a release layer coupled to the binding layer such that the binding layer is between the insulation layer and the binding layer. The insulation layer may include a polymeric membrane. The binding layer may include a water content between 0.2 wt. % of water to 5 wt. % of water. The binding layer is non-tacky such that the binding layer may include a coupling force of less than 0.4 pounds-force. The binding layer may be configured to be activated to be tacky such that the binding layer includes a coupling force between 3-10 pounds-force. The binding layer may be configured to be activated to be tacky such that the binding layer has a water content between 55 wt. % to 90 wt. % of water. The binding layer may include an adhesive. The binding layer may be configured to be activated to be tacky such that the binding layer includes an activated portion that is tacky, and the release layer is configured to not be coupled to the activated portion. The release layer may defines a perforation line extending along at least a portion of the release layer.

Another aspect of the disclosure provides for a method of forming a membrane, comprising providing a water-impermeable insulation layer, coupling a high water content binding substrate on the insulation layer, and drying the binding substrate into a binding layer that is dry and non-tacky to form the membrane.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Some water-based membranes may include a binding layer having a high water content and may not require additional applications of water to be tacky. For example, such water-based membranes may include an adhesive layer having 55% or more water by weight. Such a high water content allows for the binding layer to have a tackiness sufficient to adhere to adjacent structures. However, a high water content water-based membrane may not always be preferred.

For example, a high water content membrane may be heavy and occupy more space. Moreover, such a water-based membrane may be difficult to transport and install during colder seasons as the high water content in the membrane may freeze, thus diminishing ability for the binding layer to stick to other structures. The constant tackiness of the high water content membrane may additionally require a release layer attached to the exposed surface of the binding layer to prevent the membrane from inadvertently sticking to an unintended object or structure. This release layer adds additional cost and complexity to manufacturing. Further, precise positioning of the constant tackiness of the high water content membrane may be required to property position the membrane without accidentally sticking the membrane in an incorrect position. Such precision may lead to high labor and time costs.

The present disclosure is related to drying the binding layer of water-based membranes such that the binding layer may later be activated to be tacky with the application of water. Drying the water membrane provides significant benefits compared to a high water content membrane. For example, drying the membrane may decrease the weight of the membrane by 20-40% as compared to a high water content membrane, thus decreasing transportation costs. Moreover, the dried membrane may be more dense as a result of not having as much water filling the binding layer, thus allowing for more membranes to be transported within a given space. The dried membrane facilitates its installation during cold seasons. For example, the dried binding layer may have a sufficiently low water content that, even if the minimal amount of water in the dried binding layer freezes, the tacky qualities of the binding layer (when later activated) would not be affected.

Further, drying the membrane may remove the tackiness from the binding layer of the dried membrane such that that the binding layer may not have sufficient tackiness to adhere to adjacent structures without an application of water. This may allow for easier installation of the dried membrane. Specifically, the dried membrane may be more forgiving to positioning mistakes than the high water content membrane because the lack of tackiness on the dried membrane allows it to be re-positioned with less issue. Such a decrease in requisite precision may decrease labor and time costs. Additionally, the dried membrane's lack of constant tackiness may allow for the dried membrane to be packaged and transported without a release layer. As the dried membrane would not stick to other objects without application of water, the dried membrane may be packaged and transported without a release layer on the binding layer, thus decreasing the manufacturing cost and complexity of the membrane.

I. Exemplary Membranes

Figure 1:
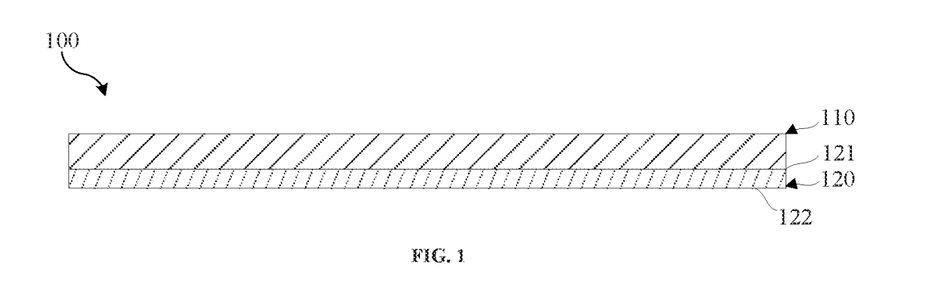
FIG. 1 depicts a cross-sectional view of a membrane, according to some embodiments.

FIG. 1 depicts an exemplary membrane 100 in a dry state. The membrane 100 includes an insulation layer 110 and a binding layer 120. The insulation layer 110 may thermally insulate a structure upon which the membrane 100 is installed. For example, once the membrane 100 is installed, the insulation layer 110 may form the outer layer of a roof to provide the roof water impermeability, heat reflection, ultra-violet damage reduction, or the like.

The insulation layer 110 may include a material that provides one or more of the insulative qualities listed above. For example, the insulation layer 110 may include a material such that the insulation layer 110 is water-impermeable. In some embodiments, the insulation layer 110 may include one or more polymeric membranes and/or other waterproofing layers. For example, a polymeric membrane may form the outer layer of the roof once fully installed and be water-impermeable to prevent leaks in the roofing structure and provide aesthetic appeal to the finished roof. The polymeric membrane may have a white exterior but may also be made in various other colors or shades, such as grey, tan, black, and the like. White polymeric membranes are often used to provide a pleasing appeal to the building and/or to reflect radiation and thereby minimize heat island effects. In other embodiments, a black or other dark polymeric membrane may be provided. Such polymeric membranes absorb more radiant heat than white polymeric membranes, which may be beneficial in colder environments by allowing for condensation to evaporate quicker, and snow and ice to melt more rapidly on black roofs than white roofs.

In some embodiments, polymeric membranes may be formed of various synthetic rubber materials, modified bitumen, or thermoplastic materials. For example, insulation layer 110 may commonly include thermoplastic polyolefin (TPO), polyvinyl chloride (PVC), ethylene propylene diene monomer (EPDM), chlorinated polyethylene (CPA), and/or modified bitumen, although some embodiments may use other thermoset and/or thermoplastic roofing membranes. In some embodiments, the polymeric membrane may include one or more polymers blended with one or more fillers. For example, in some embodiments the polymeric membranes may include some combination of the following materials: polypropylene, polyethylene, block copolymer polypropylene, rubber, plasticizers, fiberglass, carbon fiber, fire retardants, and the like. In another embodiment, a polymeric membrane may have a purer polymer blend without or with very few fillers. For example, the polymeric membrane may include mainly polypropylene or polyethylene or some combination of these polymers with little to no fillers, although in some embodiments, these polymeric membranes may include some amount of a filler, such as a fire retardant. The insulation layers 110 may be made of other materials, such as those noted in U.S. Patent Application Publication No. 2022/0314585, entitled "Hybrid Roofing Membrane and Methods of Making Same," U.S. Patent Application Publication No. 2021/0339279, entitled "Slip Resistant Protective Coating for Single-Ply Membranes," each of which are incorporated by reference herein in their entirety.

The binding layer 120 may include an insulation surface 121 coupling the binding layer 120 to the insulation layer 110 and a binding surface 122 configured to couple the binding layer 120 to a structure. In this manner, once the membrane 100 is installed, the binding layer 120 may secure the membrane 100 to the structure (e.g., roofing materials, such as steel, concrete, or wood) such that the binding layer 120 forms an inner layer of the membrane 100. The binding layer 120 may be a continuous coating that is substantially coextensive with the insulation layer 110. However, in other embodiments, the binding layer may include binding material discontinuously placed (e.g., a series of lines, dots, or other geometric shapes) along the insulation layer.

The binding layer 120 may include one or more binding elements. For example, the binding element may include an adhesive. One example of such an adhesive may include polymer adhesives, such as acrylic acid adhesives or cold polymers. An example of acrylic acid adhesives is poly vinyl alcohol. Other example binding elements may be described in U.S. patent application Ser. No. 11/075,201 entitled "Fiberglass Binder Utilizing a Curable Acrylate and/or Methacrylate," issued as U.S. Pat. No. 7,321,010, and U.S. patent application Ser. No. 17/324,232 entitled "Double Pass Process of Making a Self Adhering Roofing Membrane with Improved Adhesion at Lower Installation Temperature," each of which are incorporated by reference herein in their entirety.

The binding layer 120 may be provided in a dry state. In particular, the binding layer 120 may have between about 5% by weight of water to 0.2 wt. % of water. In some embodiments, the binding layer 120 may have between about 0.5 wt. % to 4.5 wt. % of water, between about 1.5 wt. % to 3.5 wt. % of water, and between about 2.5 wt. % to 3.5 wt. % of water. In this dry state, the binding layer 120 may have sufficient water content such that the binding layer 120 remains coupled (e.g., adhered) to the other portions of the membrane 100 that the binding layer 120 was already in contact with prior to drying (e.g., during the manufacturing process), such as the insulation layer 110, but does not have enough moisture for the binding surface 122 to be tacky to other structures that were not in contact with the binding layer 120 prior to drying. As such, the binding layer 120 may have a pulpy tactile sensation but may not be a powder. The binding surface 122 may be dry and non-tacky such that there is substantially no material transfer to a structure contacting the binding layer 120 from the binding layer 120. Specifically, the binding surface 122 may be non-tacky where the binding surface 122 has a coupling force (e.g., an adhesion force) to a structure coming in contact with the binding surface 122 of less than 0.4 pounds-force. In some embodiments, the binding surface 122 in a dry state would provide between about 0.05-0.35 pounds-force, 0.1-0.3 pounds-force, 0.15-0.25 pounds-force, or about 0.2 pounds-force to a structure coming in contact with the binding surface 122.

The dry state of the membrane 100 may provide benefits over other membranes with high water content binding layers. For example, the binding layer 120 may have a decreased weight relative to high water content binding layers (and, therefore, other high water content membranes). This decrease in weight may assist in decreasing transportation costs. The binding layer 120 may be more dense than high water content binding layers, thus decreasing the overall density of the membrane 100 relative to high water content membranes and allowing more membranes 100 to be transported within a given space. Further, the binding layer 120 may have sufficiently low water content that freezing the binding layer 120 (e.g., during the transportation and application of the membrane 100 in cold weather) may not affect the tackiness of the binding layer 120 when activated at a later time, as discussed further below, compared to high water content membranes.

The binding layer 120 may be water-activated such that an application of water (e.g., through misting, a mop, power wash tool, or the like) to the binding layer 120 may activate the portions of the binding layer 120 to be tacky. The binding layer 120 may have a thickness corresponding to a desired time it takes to activate the binding layer 120 after application of water and a desired tackiness (e.g., based on what material the corresponding structure is). For example, a thicker binding layer may provide a greater coupling force to a corresponding structure than a thinner binding layer but may require a longer time and/or more water to activate. As such, the thickness of the binding layer 120 may be controlled to correspond to a desired time to activate the binding layer 120. For example, the binding layer 120 may have a thickness such that the binding layer 120 is instantly activated upon being misted by a spray or mist of water.

The membrane 100, and layers 110, 120, may be sized and shaped to couple with other structures (e.g., roofing structures). For example, the membrane 100 may include a length and width sufficient to cover a roof of a building. The insulation layer 110 may include a thickness of between about 45-90 mils. In some embodiments, the insulation layer 110 may be between about 50-80 mils, between about 65-75 mils, or about 70 mils. The binding layer 120 may include a thickness of between about 1-10 mils. In some embodiments, the binding layer 120 may include a thickness between about 2-9 mils, between about 3-8 mils, between about 4-6 mils, or about 5 mils. As such, the membrane 100 may include a thickness of 0.25 inches to 2 inches. In some embodiments, the insulation layer 110 may include a thickness between about 0.3-1.75 inches, 0.5-1.5 inches, 0.75-1.25 inches, or about 1 inch.

Figure 2:
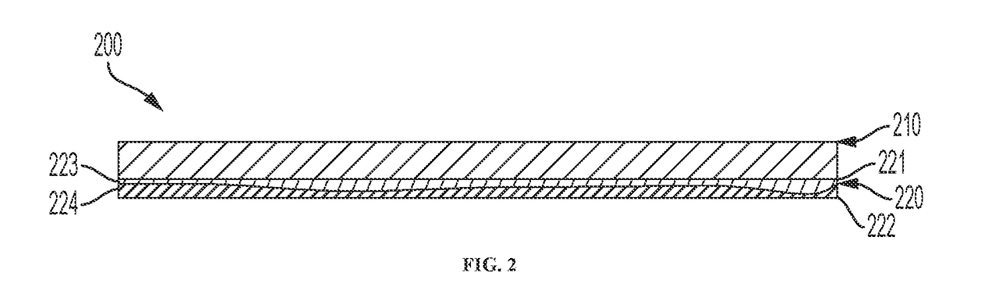
FIG. 2 depicts a cross-sectional view of a membrane, according to some embodiments.

FIG. 2 depicts an exemplary membrane 200 in an activated state. It is understood that features ending in like reference numerals as features discussed above are similar, except as noted below. The membrane 200 may be the membrane 100 after water has been applied to the binding layer 120. As such, the binding layer 220 may include a dry portion 223 and an activated portion 224. The dry portion 223 may be a portion of the binding layer 220 in a dry state, as discussed above. The activated portion 224 may be a portion of the binding layer 220 after water has been applied to a dry-state binding layer (e.g., the binding layer 120). For example, the binding layer 220 may be a water-activated adhesive material and the activated portion 224 may be a portion of the binding layer 220 that has been activated by application of water to be tacky.

The activated portion 224 may be on an outward-facing surface of the binding layer 220 opposite the insulation layer 210. The shape of the activated portion 224 may be dependent on the type and volume of water application to the binding layer 220, as discussed below. For example, if the water is a mist applied by a mister, the activated portion may be one or more discontinuous portions on the dry layer of the binding layer. However, if sufficient water is applied on the binding layer by the mister, the activated portion may also be a large contiguous area of the binding layer. In other embodiments, where the water is applied by a mop (e.g., a semi-dry mop), the activated portion may be a large, contiguous area on the dry portion 223. The activated portion 224 may substantially cover all of the dry portion 223 depending on how much water is applied on the binding layer 220. However, in other embodiments, the activated portion may not cover all of the dry portion.

The activated portion 224 may have a coupling force (e.g., an adhesion force) of 3-10 pounds-force to couple the membrane 200 to an adjacent structure in contact with the binding surface 222. In some embodiments, the binding surface 222 of the activated portion 224 would provide between about 3-9 pounds-force, 5-8 pounds-force, or between about 6-7 pounds-force.

In order for the binding surface 222 to provide tackiness, the binding layer 220 may require sufficient water to activate the binding layer 220 but not so much that the binding layer 220 is oversaturated. Too much water saturation may dilute the binding element and inhibit the tackiness of the binding layer 220. As such, the binding layer 220 may have a water content between about 55 wt. % to 90 wt. % of water. In some embodiments, to remain tacky, the binding layer 220 may have between about 60 wt. % to 85 wt. % of water, between about 65 wt. % to 75 wt. % of water, or between about 67 wt. % to 70 wt. % of water. The ratio of the activated portion 224 to the dry portion 224 as depicted in FIG. 2 is for illustrative purposes only. For example, in some embodiments, the dry-state binding layer may be provided with just enough water that the outward-facing surface of the binding layer is wet.

Turning back to FIG. 1, as the binding surface 122 has such a low tackiness after drying, the membrane 100 may be packaged without a release layer on top of the binding layer 120 to prevent the binding layer 120 from sticking to other objects, as would be required in a high water content membrane. However, in other embodiments, a release layer may still be provided on top of the binding layer to protect the binding layer from contaminants contacting the binding layer and inhibiting the later activation of the binding layer.

Figure 3A:
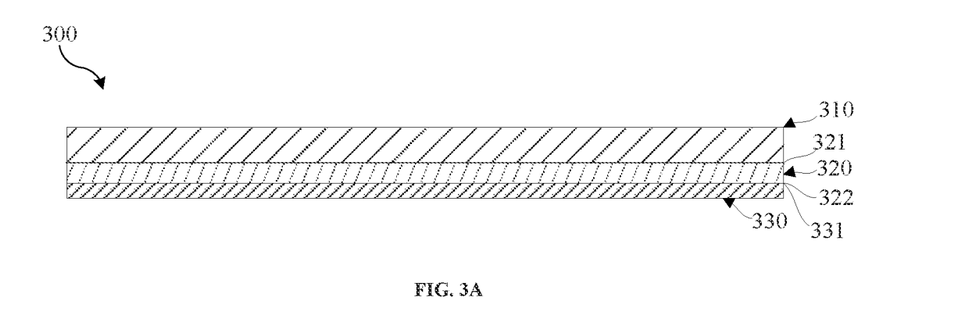
FIG. 3A depicts a cross-sectional view of a membrane, according to some embodiments.
Figure 3B:
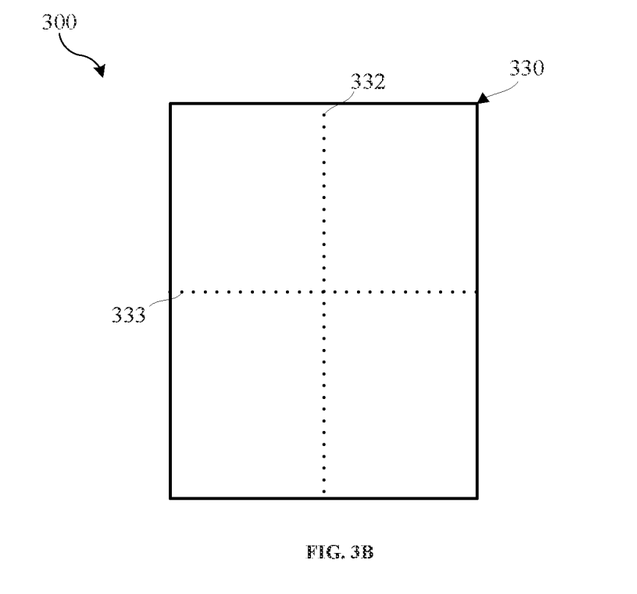
FIG. 3B depicts a top view of a release layer of the membrane of FIG. 3A.

For example, FIGS. 3A and 3B depict an exemplary membrane 300 in a dry state. It is understood that features ending in like reference numerals as features discussed above are similar, except as noted below. Turning to FIG. 3A, the membrane 300 may include a release layer 330 coupled to the binding layer 320 such that the binding surface 322 is not exposed. In this manner, the release layer 330 may protect the binding layer 320 from contaminants contacting the binding layer 320. Further, the release layer 330 may prevent the binding layer 320 from being dried too much such that the binding layer 320 is unable to remain coupled to the insulation layer 310. The release layer 330 may include a release surface 331 coupled to the binding surface 322 of the binding layer 320. The release surface 331 may be treated with silicone or another suitable release agent to allow for the release layer 330 to be easily removable from the binding layer 320. For example, the release layer 330 and the binding layer 320 may be coupled together with a coupling force of less than 0.5 pounds-force. In some embodiments, the release layer 330 and the binding layer 320 may be coupled together with a coupling force of between about 0.05-0.45 pounds-force, 0.1-0.4 pounds-force, 0.15-0.35 pounds-force, or about 0.2 pounds-force to a structure coming in contact with the binding surface 122.

Turning to FIG. 3B, the release layer 330 may include one or more perforation lines 332, 333 defined to extend at least across a portion of the release layer 330. The perforation lines 332, 333 may be a series of dots, slits, or the like defined through the release layer 330. The perforation lines 332, 333 may allow for sections of the release layer 330 to be more easily torn from each other. The perforations may be equal in in size and length or, in other embodiments, unequal. In some embodiments, the perforation lines may be a single cut along the release layer extending across substantially the entire release layer. In other embodiments, the perforation lines are not straight but, rather, curved, angled, or the like. Moreover, in other embodiments, there may be more or less than two perforations lines (e.g., a single horizontal or vertical perforation line). In other some embodiments, the perforation lines may extend the entire length and/or width of the release layer. However, in other embodiments, the perforation lines may extend only a portion of the release layer.

II. Exemplary Manufacturing Methods

Figure 4:
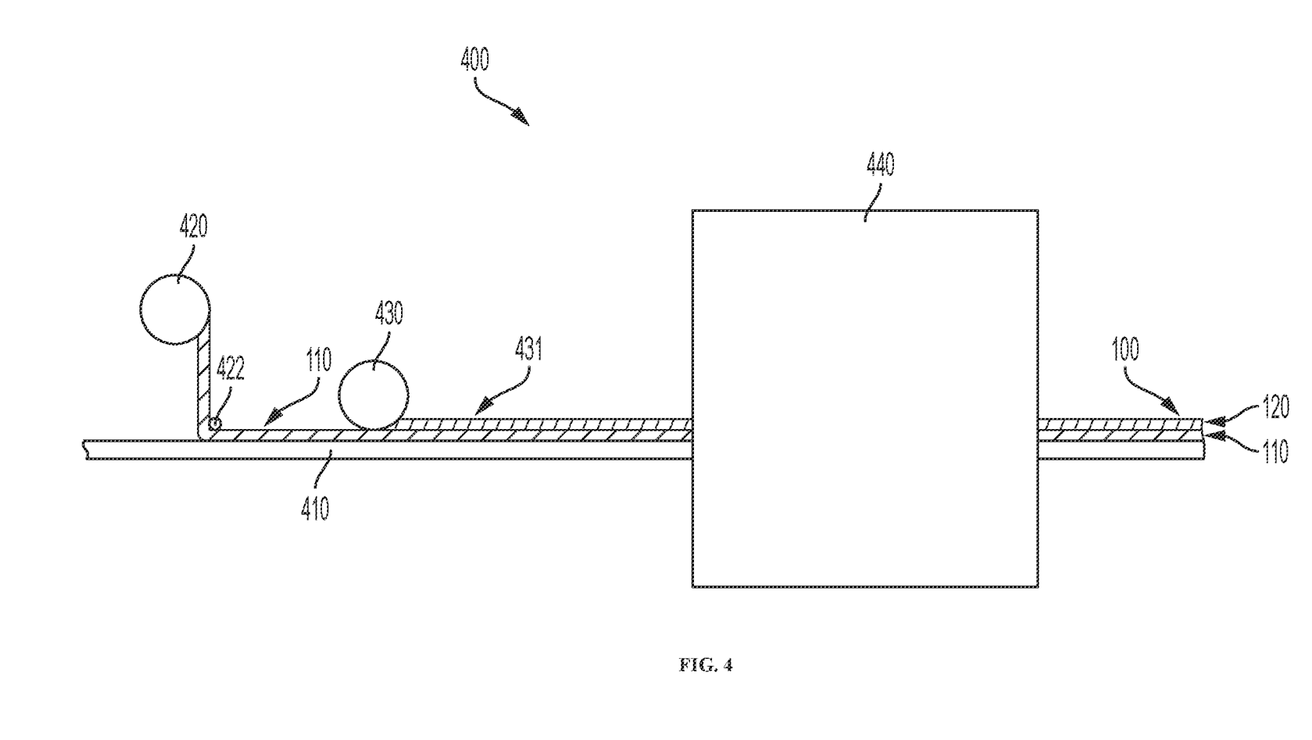
FIG. 4 depicts the formation of the membrane of FIG. 1, according to some embodiments.

FIG. 4 depicts an exemplary method of manufacturing the membrane 100. The drying system 400 may include a conveyor belt 410, an insulation roll 420, a roller 422, a binding applicator 430, and a heating chamber 440. The insulation roll 420 may be a roll of insulation layer 110. The roller 422 may be a free-spinning roller for the insulation layer 110 to wrap around as the insulation layer 110 leaves the insulation roll 420 to be positioned on the conveyor belt 410. In this manner, the insulation layer 110 may be pulled out of the insulation roll 420 about the roller 422 and transported along the conveyor belt 410.

The conveyor belt 410 may transport the insulation layer 110 to the binding applicator 430. The binding applicator 430 may couple a binding substrate 431 to the insulation substrate 421. The binding substrate 431 may include one or more binding elements as discussed above. The binding substrate 431 may include a high water content such that the binding substrate 431 is still wet when applied on the insulation layer 110. In some embodiments, the binding applicator 430 may be a roller that rolls onto the insulation substrate 421 to deposit the binding substrate 431 as the conveyor belt 410 transports the insulation substrate 421 past the binding applicator 430. However, in other embodiments, the binding applicator may be a sprayer that sprays the binding substrate onto the insulation substrate or other means of applying the binding substrate.

The binding substrate 431 may include a similar binding material as described above for the binding layer 120 except having a higher water content than the binding layer 120. For example, the binding substrate 431 may have greater than 55 wt. % of water. In some embodiments, the binding substrate 431 may have between about 60 wt. % to 90 wt. % of water, between about 75 wt. % to 85 wt. % of water, and between about 70 wt. % to 80 wt. % of water. The binding applicator 430 may deposit the binding substrate 431 onto the insulation layer 110 with a certain thickness such that, once the binding substrate 431 is dried (as discussed further below) into a binding layer 120, the binding layer 120 may have a desired thickness corresponding to a desired length of time to activate the binding layer 120.

Once the binding substrate 431 is coupled to the insulation substrate 421, the conveyor belt transports both the insulation substrate 421 and binding substrate 431 through the heating chamber 440 to dry the binding substrate 431 into a dry binding layer 120. The heating chamber 440 may be a convection oven set to a particular temperature, and the conveyor belt 610 may be set to a particular speed, to dry the water content of the binding substrate 431 to the binding layer 120 in a dry state over a certain period of time. For example, the binding substrate 431 may be dried from 55 wt. % of water to 5 wt. % of water or less for the binding layer 120. The temperature of the heating chamber 440 and the speed of the conveyor belt 610 may be adjusted based on the water content and thickness of the binding substrate 431. In other embodiments, the heating chamber may include infrared heating or other means of heating the binding substrate.

The membrane 100 is formed once the binding substrate 431 is dried into the binding layer 120. The membrane 100 may then be packaged for transportation. For example, the membrane 100 may be rolled into a roll, or the membrane may be cut into pieces and stacked together.

Figure 5:
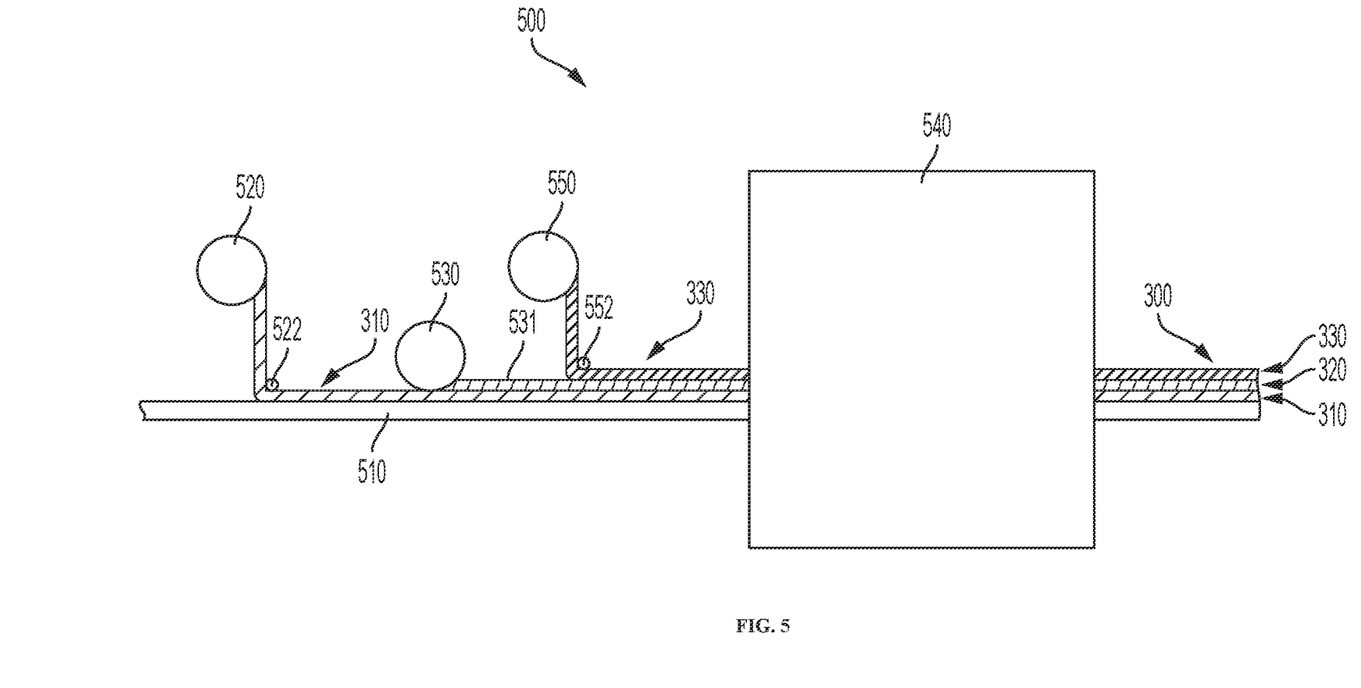
FIG. 5 depicts the formation of the membrane of FIGS. 3A and 3B, according to some embodiments.

In some embodiments, a membrane may be manufactured with a release layer (e.g., release layer 330). FIG. 5 depicts an exemplary method of manufacturing the membrane 300 from an insulation layer 310, release layer 330, and binding substrate 531 using a drying system 500. It is understood that features ending in like reference numerals as features discussed above are similar, except as noted below. Once the binding substrate 531 is applied on the insulation layer 310, the conveyor belt 531 may transport the insulation layer 310 and binding substrate 531 past the roller 552 (similar to the rollers 422, 522) so that the release layer 330 may be applied on the binding substrate 531. In particular the release layer 330 may be pulled from the release roll 550 and wrapped about the roller 552 to couple to the binding substrate 531. The insulation layer 310, binding substrate 531, and release layer 330 may then be transported by the conveyor belt 510 into the heating chamber 540 to dry the binding substrate 531 into the binding layer 320 and form the membrane 300. Although FIG. 5 depicts the release layer 330 being applied on the binding substrate 531 before being transported into the heating chamber 540, in other embodiments, the release layer may be applied on the binding layer after the binding substrate has been dried into the binding layer.

Where the release layer 310 includes one or more perforation lines (e.g., perforation lines 332, 333), the perforation lines may act as vents for moisture to release from. In this manner, the steam released from drying the binding substrate 531 may be vented through the perforation lines.

III. Exemplary Method of Use

Figure 6A:
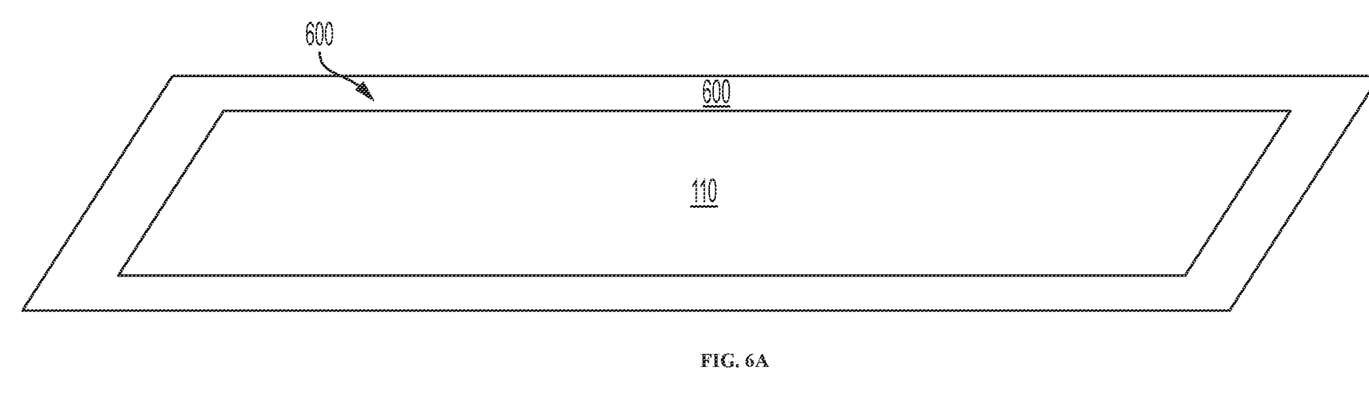
FIGS. 6A and 6B depict the installation of the membrane 100 on a structure, according to some embodiments.
Figure 6B:
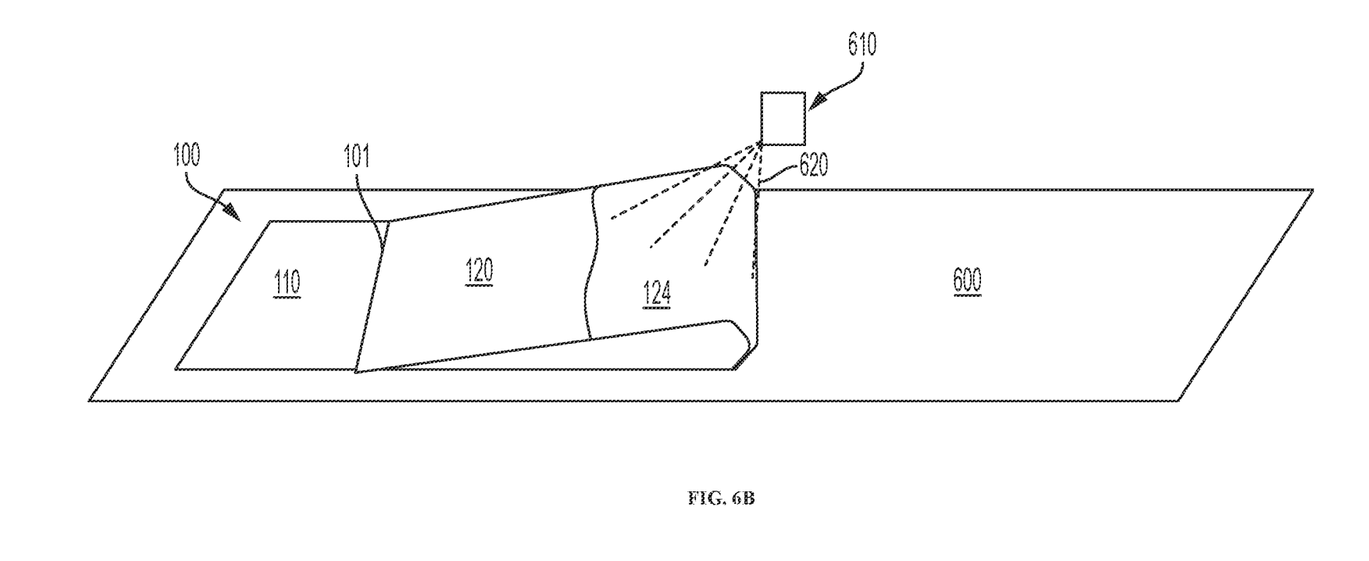

FIGS. 6A and 6B depict a method of installing the membrane 100 on a structure 600. Once the packaged membrane 100 has been received by an end user, the end user may unpack the membrane 100 (e.g., by unrolling a layer of membrane 100, 300 out of a roll or removing one layer of the membrane 100 from a stack of membranes 100, 300) for application to a structure 600. The structure 600 may be a roofing structure. Although the structure 600 is depicted as being substantially planar, in other embodiments, the structure may include non-planar elements, such as pipe boots, corners, air conditioning units, or the like. Once the membrane 100 has been unpackaged, the membrane 100 may be laid out on top of a structure (not shown), as shown in FIG. 6A, so that the insulation layer 110 faces outward while the binding layer 120 faces toward the structure 600. However, in other embodiments, the membrane may be positioned on the structure such that the binding layer is facing outwards and the insulation layer is facing inward. This may be beneficial, for example, to determine where to position the membrane before turning over the membrane and activating the binding layer.

Turning to FIG. 6B, an edge 101 of the membrane 100 may be pulled back (e.g., toward a toward a midline of the membrane 100) to expose a portion of the binding layer 120. Although FIG. 6B depicts an entire edge of the membrane 100 being pulled back, in other embodiments, only a corner may be pulled back. In a yet further embodiment, multiple edges or corners (e.g., opposite edges or corners) may be pulled back. In an even further embodiment, the edge along a length of the membrane may be pulled back rather than the edge along a width of the membrane. In yet other embodiments, the entire binding layer 120 may be exposed.

Once a portion of the binding layer 120 is exposed, water may be applied on at least a portion of the exposed surface of the binding layer 120 to activate the binding layer 120 to include an activated portion 124. For example, a water applicator 600 may apply water 620 onto the binding layer 120. The water applicator 600 may include a mister, power wash, mop, hose, or the like. The water 620 may be applied on the binding layer 120 in the form of mist, spray, a constant stream, or may be wiped on. As discussed above, the amount of water 120 required to activate the binding layer 120 may correspond to a thickness of the binding layer 120.

The water applicator 600 may apply water 620 along the entire exposed portion of the binding layer 120. For example, the water applicator 600 may apply water 620 from a bent edge of the membrane 100 to the edge 101. However, in other embodiments, water may applied to less than the entire exposed surface of the binding layer. Once sufficient water 620 has been applied to the exposed portion of the binding layer 120 to activate that portion of the binding layer 120 (but not enough to oversaturate the binding layer 120, as discussed above) to include an activated portion 124, the activated portion 124 may be positioned back onto the structure 600. For example, the membrane 100 may be rolled back onto the structure 600 so that the activated portion 124 contacts the structure 600. Where only a portion of the binding layer 120 was exposed and activated, the rest of the membrane 100 (e.g., the other half of the membrane 100) may be rolled back and activated, as described above.

In some embodiments, the activated portion 124 may be rolled back onto the structure 600 as the water applicator 610 applies the water 620 but prior to applying water 620 to the entire exposed portion of the binding layer 120. In this example, the water applicator 610 may apply water 620 to the exposed portion of the binding layer 120 closest to the structure 600 as the membrane 100 is rolled back onto the structure 600. This method of installing the membrane 100 may expedite the installation process and minimize the time that the activated portion 124 is exposed to the environment. However, in other embodiments, the water applicator may apply water to the entire portion of the exposed binding layer prior to rolling the activated portion back onto the structure.

Once the entirety of the binding layer 120 has been activated to the activated portion 124 and coupled to the structure 600, a weighted roller or broom (not shown) may be rolled on the outward facing insulation layer 110 to maximize the amount of contact between the activated portion 124 and the structure 600. However, in other embodiments, there may be no weighted roller or broom used and the activated portion may simply be rolled back onto the structure. The activated portion 124 may bind the membrane 100 after a period of time, depending on the thickness of the binding layer 120, humidity, and temperature. For example, in some embodiments, the activated portion 124 may bind the membrane 100 to the structure 600 after 24 hours in 40° C. at 40% humidity. In other embodiments, the water may be applied on the structure rather than the binding layer.

Figure 7:
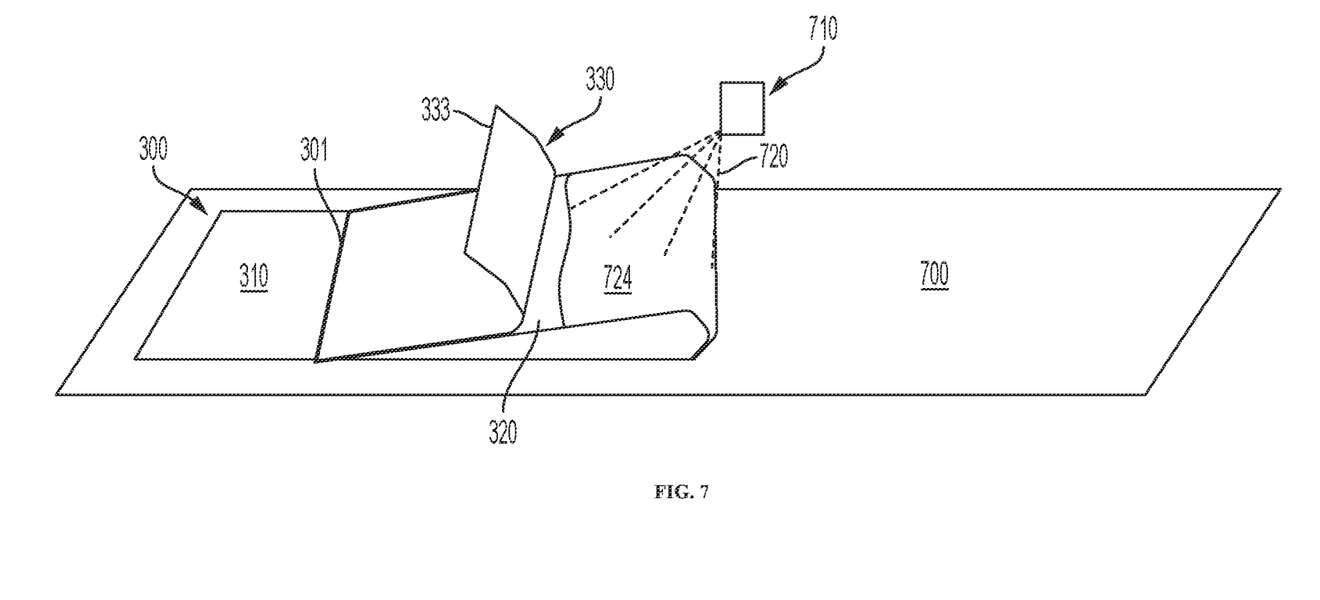
FIG. 7 depicts the installation of the membrane of FIGS. 3A and 3B on a structure, according to some embodiments.

In other embodiments, prior to applying water to the exposed portion of the binding layer, at least a portion of a release layer may first be removed. For example, FIG. 7 depicts a method of installing the membrane 300 on a structure 700. It is understood that features ending in like reference numerals as features discussed above are similar, except as noted below. Once the membrane 300 has been unpackaged and positioned on the structure 700 such that the release layer 330 faces inward and the insulation layer 310 faces outward, the edge 301 of the membrane 300 may be pulled back to expose a portion of the release layer 330 (similar to pulling back the binding layer 120, as discussed above for FIGS. 6A and 6B).

Once the portion of the release layer 330 is exposed to face outward, at least a portion of the release layer 330 may be peeled back to expose a portion of the binding layer 320. For example, the release layer 330 may be peeled back from the perforated line 333 by tearing along the perforated line 333 and pulling the perforated line 333 away from the binding layer 320 toward the edge 301. In other embodiments, the release layer may be peeled back from an edge other than the perforated line. In a yet further embodiment, there may be no perforated line and an intermediate section of the release layer may simply be cut to expose an edge to be pulled back. In other embodiments, only a corner may be pulled to expose the binding layer. In a yet further embodiment, multiple corners and edges (e.g., opposite corners and edges) may be pulled backed to expose the binding layer.

Once the portion of the binding layer 320 is exposed, the water applicator 710 may apply water 720 to the exposed binding layer 320 to activate a portion of the exposed binding layer 320 to an activated portion 724. The water applicator 710 may apply water 720 as the release layer 330 is peeled to expose the binding layer 320, prior to all of the release layer 330 being removed. At the same time, the activated portion 724 may be rolled onto the structure 700. In this manner, the activated portion 724 may be rolled onto the structure 700 as the release layer 330 is peeled back and water 720 applied to the exposed portion of the binding layer 320 exposed from peeling back the release layer 330. However, in other embodiments, the entire release layer may be peeled back to expose the binding layer before applying the binding layer to activate the activated portion.

Although the above disclosure has been directed to installing a membrane on roofing structures, in other embodiments, the membrane may be installed on any structure. For example, the membrane may be installed on accessories on a roof, such as pipes, ventilation units, or the like. Moreover, the membrane may be installed on any surface, including other steel, concrete, and wood surfaces.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

What is claimed is:

1. A roofing membrane, comprising:
a water-impermeable insulation layer;
a binding layer coupled to the insulation layer, wherein:
the binding layer is dry and non-tacky; and
the binding layer is configured to be tacky upon an application of water; and
a release layer coupled to the binding layer such that the binding layer is between the insulation layer and the release layer.

2. The roofing membrane of claim 1, wherein the insulation layer includes a polymeric membrane.

3. The roofing membrane of claim 1, wherein the binding layer includes a water content between 0.2 wt. % of water to 5 wt. % of water.

4. The roofing membrane of claim 1, wherein the binding layer is non-tacky such that the binding layer includes a coupling force of less than 0.4 pounds-force.

5. The roofing membrane of claim 1, wherein the binding layer is configured to be activated to be tacky such that the binding layer includes a coupling force between 3-10 pounds-force.

6. The roofing membrane of claim 1, wherein the binding layer is configured to be activated to be tacky such that the binding layer has a water content between 55 wt. % to 90 wt. % of water.

7. The roofing membrane of claim 1, wherein the binding layer includes an adhesive.

8. The membrane of claim 1, wherein:
the binding layer is configured to be activated to be tacky such that the binding layer includes an activated portion that is tacky; and
the release layer is configured to not be coupled to the activated portion.

9. The membrane of claim 1, wherein the release layer defines a perforation line extending along at least a portion of the release layer.

10. A roofing membrane, comprising:
a water-impermeable insulation layer; and
a binding layer coupled to the insulation layer, wherein:
in a dry state, the binding layer is non-tacky; and
in an activated state, the binding layer is tacky such that the binding layer includes a coupling force between 4-10 pounds-force.

11. A roofing membrane, comprising:
a water-impermeable insulation layer; and
a binding layer coupled to the insulation layer, wherein:
in a dry state, the binding layer is non-tacky such that the binding layer includes a coupling force of less than 0.4 pounds-force; and
in an activated state, the binding layer is tacky.

12. A roofing membrane, comprising:
water-impermeable insulation layer; and
a binding layer coupled to the insulation layer, wherein:
in a dry state, the binding layer is non-tacky; and
in an activated state, the binding layer is tacky and includes a water content between 55 wt. % to 90 wt. % of water.

13. A roofing membrane, comprising:
a water-impermeable insulation layer; and
a binding layer coupled to the insulation layer, wherein:
in a dry state, the binding layer is non-tacky and includes a water content between 0.2 wt. % of water to 5 wt. % of water; and
in an activated state, the binding layer is tacky.

14. The roofing membrane of claim 13, wherein the insulation layer includes a polymeric membrane.

15. The roofing membrane of claim 13, wherein the binding layer includes an adhesive.

16. The roofing membrane of claim 13, further comprising a release layer coupled to the binding layer such that the binding layer is positioned between the insulation layer and the release layer.

17. The membrane of claim 16, wherein:
the binding layer in the activated state includes an activated portion that is tacky; and
the release layer is not coupled to the activated portion.

18. The membrane of claim 16, wherein the release layer defines a perforation line extending along at least a portion of the release layer.

* * * * *